United States Patent
Kwon et al.

(10) Patent No.: US 10,242,036 B2
(45) Date of Patent: Mar. 26, 2019

(54) HYBRID DETECTION RECOGNITION SYSTEM

(71) Applicants: Junghyun Kwon, Cupertino, CA (US); Ramya Narasimha, Palo Alto, CA (US); Edward L. Schwartz, Menlo Park, CA (US); Max McFarland, Sunnyvale, CA (US); Silvio Savarese, Stanford, CA (US); Kathrin Berkner, Los Altos, CA (US)

(72) Inventors: Junghyun Kwon, Cupertino, CA (US); Ramya Narasimha, Palo Alto, CA (US); Edward L. Schwartz, Menlo Park, CA (US); Max McFarland, Sunnyvale, CA (US); Silvio Savarese, Stanford, CA (US); Kathrin Berkner, Los Altos, CA (US)

(73) Assignee: Ricoh Co., Ltd., Tokyo (JP)

( * ) Notice: Subject to any disclaimer, the term of this patent is extended or adjusted under 35 U.S.C. 154(b) by 401 days.

(21) Appl. No.: 15/199,553

(22) Filed: Jun. 30, 2016

(65) Prior Publication Data

US 2016/0342863 A1    Nov. 24, 2016

Related U.S. Application Data

(63) Continuation-in-part of application No. 13/967,288, filed on Aug. 14, 2013, now Pat. No. 9,400,968.
(Continued)

(51) Int. Cl.
*G06F 17/30* (2006.01)
*G06K 9/46* (2006.01)
(Continued)

(52) U.S. Cl.
CPC .... *G06F 17/3028* (2013.01); *G06F 17/30247* (2013.01); *G06F 17/30259* (2013.01);
(Continued)

(58) Field of Classification Search
CPC ................................. G06F 17/30256
See application file for complete search history.

(56) References Cited

U.S. PATENT DOCUMENTS

| 6,711,293 B1 * | 3/2004 | Lowe ............... G06K 9/4671 382/219 |
| 2008/0095470 A1 | 4/2008 | Chao |

(Continued)

FOREIGN PATENT DOCUMENTS

EP    2838054 A2    2/2015

OTHER PUBLICATIONS

Pierre Sermanet et al. "OverFeat: Integrated Recognition, Localization and Detection Using Convolutional Networks," dated Feb. 24, 2014, 16 pages.
(Continued)

*Primary Examiner* — A. Hunter Wilder
(74) *Attorney, Agent, or Firm* — Patent Law Works LLP

(57) ABSTRACT

A system and method for determining an object or product represented in an image is disclosed. The system receives a first image, determines a region of interest in the first image, determines a classification score for the region of interest using a convolutional neural network that assigns the region of interest the classification score corresponding to a class, and identifies a first product in the first image based on the classification score.

12 Claims, 9 Drawing Sheets

Related U.S. Application Data

(60) Provisional application No. 62/304,713, filed on Mar. 7, 2016.

(51) Int. Cl.
  *G06Q 30/02* (2012.01)
  *G06K 9/62* (2006.01)

(52) U.S. Cl.
  CPC ......... *G06K 9/4628* (2013.01); *G06K 9/4647* (2013.01); *G06K 9/6212* (2013.01); *G06K 9/6292* (2013.01); *G06Q 30/0201* (2013.01); *G06F 17/30256* (2013.01)

(56) References Cited

U.S. PATENT DOCUMENTS

2009/0063307 A1    3/2009  Groenovelt et al.
2009/0316988 A1  12/2009  Xu et al.
2011/0011936 A1    1/2011  Morandi et al.
2014/0079314 A1    3/2014  Yakubovich et al.

OTHER PUBLICATIONS

Zheng Liang et al. "Query-Adaptive Late Fusion for Image Search and Person Re-Indentification," dated Jun. 7, 2015, 10 pages.

Sean Bell et al. "Learning Visual Similarity for Product Design with Convolutional Neural Networks," dated Jul. 27, 2015, 10 pages.

Zhang Xiaopeng et al. "Fused One-vs-All Features with Semantic Alignments for Fine-Grained Visual Categorization," dated Feb. 1, 2016, 15 pages.

Extended European Search Report for Application No. 17150982.1 dated Jun. 19, 2017, 11 pages.

Office Action from CA Application No. 2,957,433 dated Dec. 29, 2017, 7 pgs.

* cited by examiner

HYBRID DETECTION RECOGNITION SYSTEM

CROSS REFERENCE TO RELATED APPLICATIONS

The present application claims priority under 35 U.S.C. § 119 to U.S. Provisional Patent Application No. 62/304,713, filed Mar. 7, 2016 and entitled "Hybrid Detection-Recognition System," which is incorporated by reference in its entirety. The present application is also a continuation-in-part of U.S. patent application Ser. No. 13/967,288, filed Aug. 14, 2013 and entitled "Three-Dimensional Indexing Protocol," which is incorporated by reference in its entirety.

BACKGROUND

1. Field of the Invention

The specification relates to a system and method for detecting and recognizing objects in an image. In particular, the specification relates to a system and method for detecting and interpreting the content of an image using a hybrid detection recognition technique to improve recognition of objects or products depicted in the image.

2. Description of the Background Art

Products are arranged on shelves in a retail store, and the visual characteristics of the products can be very similar among products of the same category or brand. In the retail environment, there is a need for product recognition techniques to recognize a variety of products, planar and non-planar, in an image. For example, in the visual searching and matching applications used in retail context, the recognition technology needs to determine the location of product candidates on the shelf and match the detected product candidates with available images indexed in an electronic database.

Existing solutions for detecting and recognizing objects often rely on the detection and matching of feature points in the image. These feature-based approaches may yield acceptable recognition performance when a coarse description of the recognized object is sufficient. However, these existing systems are generally unable to provide a desired recognition when a fine-grained categorization and discrimination between matched candidates is required, especially in cases where similar products (e.g., products of the same category or brand) are closely positioned to each other.

SUMMARY

The techniques introduced herein overcome the deficiencies and limitations of the prior art, at least in part, with a system and method for recognizing objects or products in a query image using a hybrid detection recognition system. In one embodiment, the hybrid detection recognition system is configured to receive a first image. The system determines a region of interest in the first image. The system determines a classification score for the region of interest using a convolutional neural network. The convolutional neural network assigns the region of interest the classification score corresponding to a class. The system identifies a first product in the first image based on the classification score.

Other embodiments of one or more of these aspects include corresponding systems, apparatus, and computer programs, configured to perform the actions of the methods, encoded on computer storage devices.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
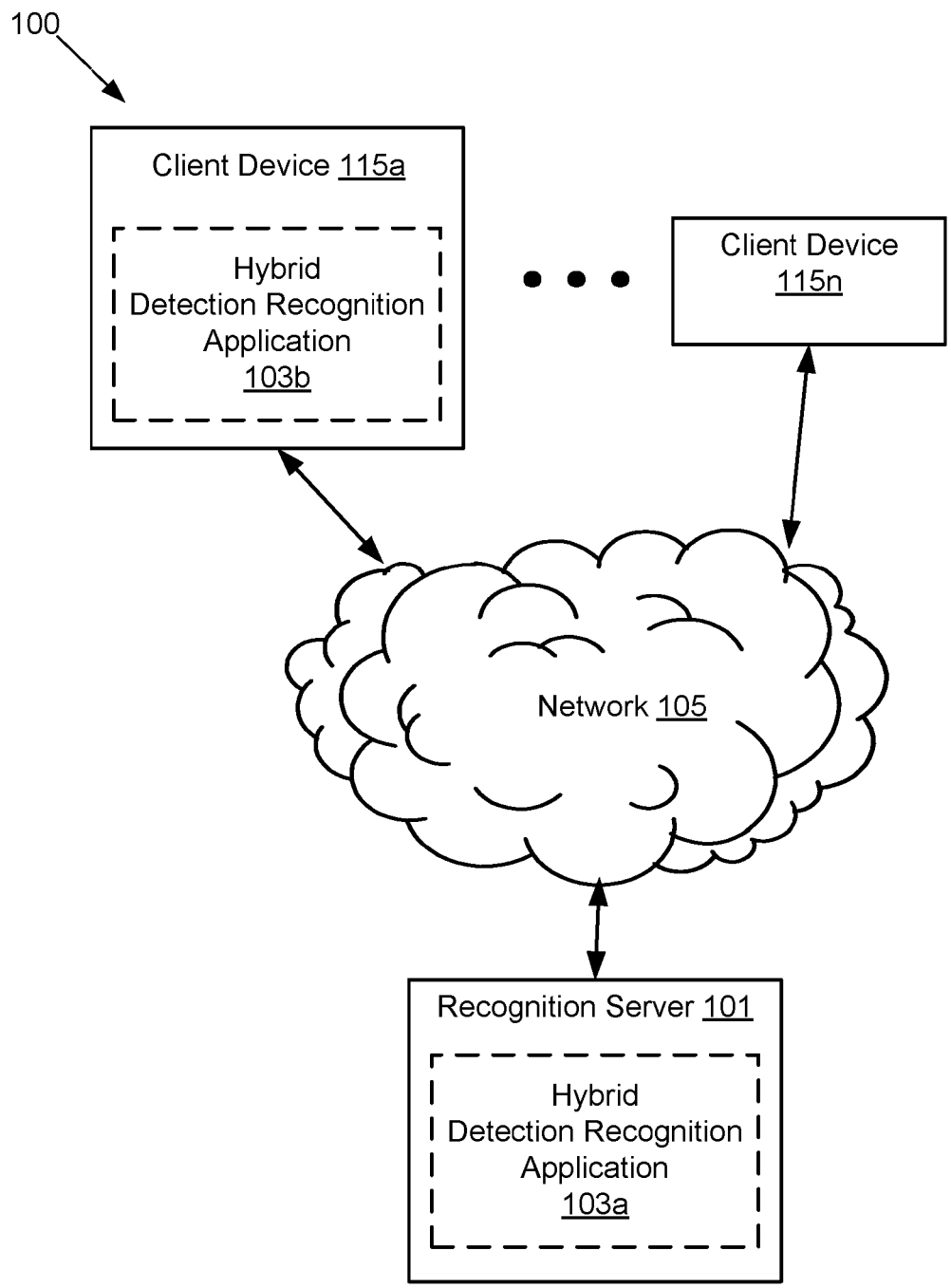
FIG. 1 is a high-level block diagram illustrating one embodiment of a system for recognizing an object in an image.

FIG. 1 is a high-level block diagram illustrating one embodiment of a system 100 for recognizing an object in an image. The illustrated system 100 may have client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In one embodiment, the system 100 includes a recognition server 101 coupled to the network 105. In some embodiments, the recognition server 101 may be, either a hardware server, a software server, or a combination of software and hardware. The recognition server 101 may be, or may be implemented by, a computing device including a processor, a memory, applications, a database, and network communication capabilities. In the example of FIG. 1, the components of the recognition server 101 are configured to implement a hybrid detection recognition application 103a described in more detail below. In one embodiment, the recognition server 101 provides services to a consumer packaged goods firm for identifying products on shelves, racks, or displays. While the examples herein describe recognition of products in an image of shelves, such as a retail display, it should be understood that the image may be include any arrangement of organized objects. For example, the image may be of a warehouse, stockroom, storeroom, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images of objects to and from the client device 115. The images of objects received by the recognition server 101 can include an image captured by the client device 115, an image copied from a website or an email, or an image from any other source. In another example, the recognition server 101 sends request for datasets and receives datasets including pricing data, demographic data, etc. from a plurality of third-party servers (not shown). In some embodiments, the recognition server 101 may store the datasets in one or more data storages. Although only a single recognition server 101 is shown in FIG. 1, it should be understood that there may be any number of recognition servers 101 or a server cluster.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends a query image to the recognition server 101 and the recognition server 101 provides data in JSON (JavaScript Object Notation) format describing one or more objects recognized in the query image to the client device 115.

The hybrid detection recognition application 103 may include software and/or logic to provide the functionality for detecting a region of an image (e.g., a portion within the image or the entire image), classifying the region of the image, matching the region of the image to images of products in an index of images, and determining a product represented in the image based on classification results (or a combination of classification results and matching results). In some embodiments, the hybrid detection recognition application 103 can be implemented using programmable or specialized hardware, for example, a field-programmable gate array (FPGA) or an application-specific integrated circuit (ASIC). In some embodiments, the hybrid detection recognition application 103 can be implemented using a combination of hardware and software. In other embodiments, the hybrid detection recognition application 103 may be stored and executed on a combination of the client devices 115 and the recognition server 101, or by any one of the client devices 115 or recognition server 101.

In some embodiments, the hybrid detection recognition application 103b may act as a thin client application with some functionality executed on the client device 115 and additional functionality executed on the recognition server 101 by hybrid detection recognition application 103a. For example, the hybrid detection recognition application 103b on the client device 115 could include software and/or logic for capturing the image, transmitting the image to the recognition server 101, and displaying image recognition results. A thin client application 103b may include further functionality described herein with reference to hybrid detection recognition application 103, such as processing the image and performing feature identification.

In some embodiments, the hybrid detection recognition application 103 may receive as input a query image of one product or a scene of shelf images with many products. For example, the hybrid detection recognition application 103 may receive an image of a single box of toothpaste, or an image of a shelving unit displaying a variety of boxes of toothpaste and other types of products in a retail supermarket. The hybrid detection recognition application 103 may determine one or more objects depicted in the image and identify the depicted objects. For example, the hybrid detection recognition application 103 may identify the depicted objects by classifying one or more regions of interest in the query image into product classes using convolutional neural network (CNN). In other embodiments, the hybrid detection recognition application 103 may additionally identify the depicted objects by matching the regions of interest in the query image to indexed images using model-based features. In these embodiments, the hybrid detection recognition application 103 may combine the classification results from the convolutional neural network with the matching results using model-based features to generate the ultimate product recognition results for the detected objects. In the above example, the hybrid detection recognition application 103 may return product identifier(s), e.g., Universal Product Code (UPC), associated with the box(es) of toothpaste. The operation of the hybrid detection recognition application 103 and the functions listed above are described below in more detail with reference to FIGS. 2-9.

Figure 2:
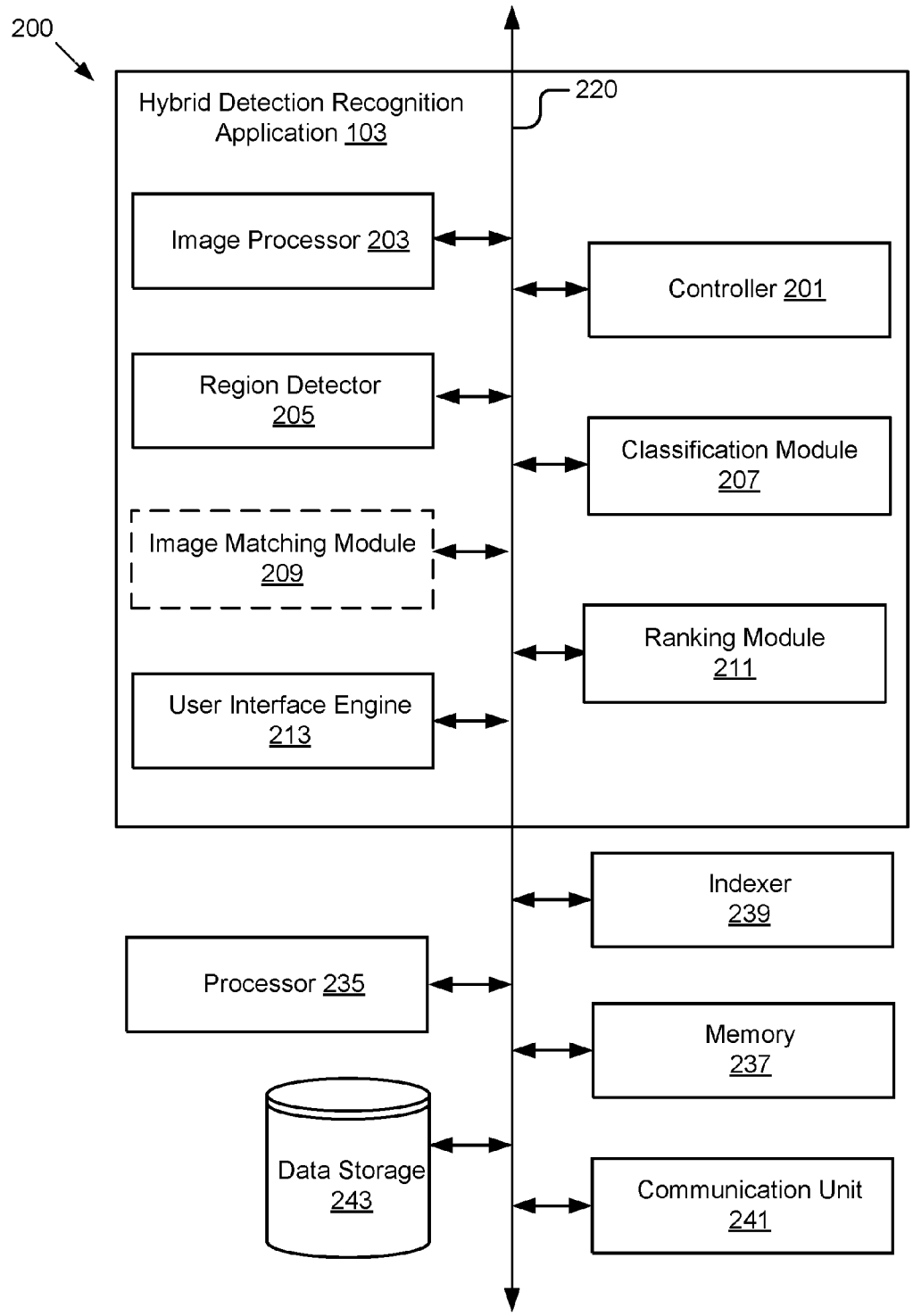
FIG. 2 is a block diagram illustrating one embodiment of a computing device including a hybrid detection recognition application.

FIG. 2 is a block diagram illustrating one embodiment of a computing device 200 including a hybrid detection recognition application 103. The computing device 200 may also include a processor 235, a memory 237, an indexer 239, a communication unit 241, and data storage 243 according to some examples. The components of the system 200 are communicatively coupled to a bus or software communication mechanism 220 for communication with each other. In some embodiments, the computing device 200 may be a client device 115, a recognition server 101, or a combination of a client device 115 and a recognition server 101.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the hybrid detection recognition application 103, and the data storage 243. It will be apparent to one skilled in the art that other processors, operating systems, sensors, displays and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the hybrid detection recognition application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray™, etc.). It should be understood that the memory 237 may be a single device or may include multiple types of devices and configurations.

The indexer 239 may include software and/or logic for indexing product images in an electronic database to make them searchable for product recognition. In particular, in some embodiments, an image of a product may be analyzed to identify a set of image features and to determine a location, an orientation, and an image description for each feature detected in the image of the product. The indexer 239 may then map the image of the product with a set of product metadata associated with the product, the set of image features identified for that image of the product, and the location in the image where each feature occurs. In some embodiments, the image of the product may be subjected to one or more synthetic modifications, e.g., cropping, scaling, blurring, brightening, etc. For example, the image of the product may be cropped to remove the background regions. The image of the product may be scaled to generate scaled images bigger and smaller than the original image to simulate an effect of varying distances between the depicted product and the camera. The image product may be blurred to simulate an effect of camera shake or bad focus, and may be brightened to simulate an effect of illumination differences. In these embodiments, image features may be extracted from these synthetically modified images and provided to the indexer 239 for indexing. The indexer 239 may map the synthetically modified images with these extracted features and with product metadata of the corresponding product. Examples of product metadata include product name, product identifier (e.g., Universal Product Code (UPC), International Article Number, International Standard Book Number (ISBN), etc.), dimensions (e.g., width, height, depth, etc.), size (e.g., gallons, pounds, fluid ounces, etc.), description, brand manufacturer, manufacturer planogram, product price, number of units on stock, employee who stocks the product, etc. In some embodiments, the indexer 239 may organize the indices to store the mappings in the data storage 243 to support a feature-based query and return results in JavaScript Object Notation (JSON) file format. In one embodiment, the indexer 239 may index the product images including the set of features in a k-dimensional tree data structure to support faster retrieval.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image including a plurality of objects to determine one or more objects and/or the location of one or more objects represented in an image. The communication unit 241 also transmits information to the client device 115 for display. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated embodiment, the data storage 243 is communicatively coupled to the bus 220.

The data storage 243 stores data for analyzing a received image and results of the analysis and other functionality as described herein. For example, the data storage 243 may store one or more indexed images. In some embodiments, an indexed image (also referred to herein as index image) is an image of a product being indexed in an electronic database. As an example, the product of image may be indexed in a database of product images in the data storage 243 by the indexer 239 as described above. In some embodiments, the data storage 243 may similarly store one or more planograms and a set of patterns determined for the one or more planograms. In some embodiments, a planogram describes a layout or positioning of items within a predefined location or geographical area. For example, a planogram can be a diagram describing layout of a retail store and indicating quantity of a product, location of the product in an aisle or on a shelf of the retail store. The data stored in the data storage 243 is described below in more detail.

In some embodiments, the hybrid detection recognition application 103 may include a controller 201, an image processor 203, a region detector 205, a classification module 207, an image matching module 209, a ranking module 211, and a user interface engine 213. The components of the hybrid detection recognition application 103 are communicatively coupled via the bus 220. The components of the hybrid detection recognition application 103 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some implementations, the components are stored in the memory 237 and are accessible and executable by the processor 235.

The controller 201 may include software and/or logic to control the operation of the other components of the hybrid detection recognition application 103. The controller 201 controls the other components of the hybrid detection recognition application 103 to perform the methods described below with reference to FIGS. 4-9. In some implementations, the processor 235, the memory 237 and other components of the hybrid detection recognition application 103 can cooperate and communicate without the controller 201.

In some embodiments, the controller 201 sends and receives data, via the communication unit 241, to and from one or more of a client device 115 and a recognition server 101. For example, the controller 201 receives, via the communication unit 241, a query image from a client device 115 operated by a user and sends the query image to the image processor 203. In another example, the controller 201 receives data for providing a graphical user interface to a user from the user interface engine 213 and sends the data to a client device 115, causing the client device 115 to present the user interface to the user.

In some embodiments, the controller 201 receives data from other components of the hybrid detection recognition application 103 and stores the data in the data storage 243. For example, the controller 201 may receive results of matching from the image matching module 209 and store the data in the data storage 243 for subsequently training the convolutional neural network. In other embodiments, the controller 201 retrieves data from the data storage 243 and sends the data to other components of the hybrid detection recognition application 103. For example, the controller 201 may receive an indexed image of a product from the data storage 243, and transmit the indexed image to the image matching module 209 for comparison with the query image.

The image processor 203 may include software and/or logic to provide the functionality for receiving and preprocessing one or more query images from the client device 115. For example, the query image may be an image of a shelving unit or a portion of the shelving unit with variety of products (e.g., coffee packages, breakfast cereal boxes, cooking oil bottles, etc.), which reflects the real situation on the shelves in a retail store. In another example, the query image may be an image of a single packaged product such as, a rectangular box of toothpaste, a circular soda can, etc. captured by the client device 115 at a distance from the shelving unit. A packaged product of a brand manufacturer may include textual and pictorial information printed on its surface that distinguishes it from other packaged products belonging to other brand manufacturers on the shelf. The packaged product may also sit in an arbitrary orientation on the shelf at any given time. For example, a cylindrical soda can may be oriented to expose the front label of the product to the user looking at the shelf.

In some embodiments, the image processor 203 may receive one or more query images from the client device 115 and may process the one or more query images in serial or in parallel. Examples of pre-processing operations performed by the image processor 203 include detecting shelf boards in the query image, applying histogram equalization, correcting distortion, etc. These pre-processing operations are particularly helpful because they can enhance the quality of the query image and limit the areas of the query image need to be searched for regions of interest. In some embodiments, if a planogram corresponding to the captured scene is available, the image processor 203 may retrieve the planogram (e.g., from the data storage 243) and compare the scene captured in the query image with the corresponding planogram to constrain the search space. Other pre-processing operations are also possible and contemplated.

In some embodiments, the image processor 203 may send the pre-processed query image to the region detector 205 for detecting one or more regions of interest. In some embodiments, the image processor 203 may store the pre-processed query image in the data storage 243.

The region detector 205 may include software and/or logic to provide the functionality for receiving one or more images and detecting one or more regions of an image for recognition by the hybrid detection recognition application 103. For example, the region detector 205 may receive the pre-processed query image from the image processor 203 and extract one or more regions of interest from the pre-processed query image.

In some embodiments, a region of interest (ROI) is a portion of the query image that potentially contains an object of interest, for example, a packaged product presented in the scene. In some embodiments, a ROI in the query image may be indicated by a bounding box enclosing the image area it covers. A ROI can be of any shape, for example, a polygon, a circle with a center point and a diameter, a rectangular shape of a width, a height and one or more reference points (e.g., a center point, one or more corner points) of the region, etc. In some embodiments, a reference point may be specified by a first coordinate value (e.g., the coordinate) and a second coordinate value (e.g., the $\vec{y}$ coordinate). As an example, the ROI may cover a packaged product or a group of packaged products in its entirety. In another example, the ROI may cover only a portion of the packaged product(s), e.g., an exposed label showing textual and pictorial information of the product, a group of symbols proximate to each other on the front side of the package, etc. As an example, a ROI in a query image of multiple soda cans on a shelf may be a rectangular polygon with its bounding box encircling a label on a soda can. Another ROI in that query image may be a combination of a symbolic brand name and a nearby label indicating type of the product (e.g., diet, organic cane sugar, etc.) on another soda can. In some examples, a query image may include multiple ROIs while in other examples, a single ROI may include the entire query image (e.g., where the query image depicted a single product alone).

Figure 3A:
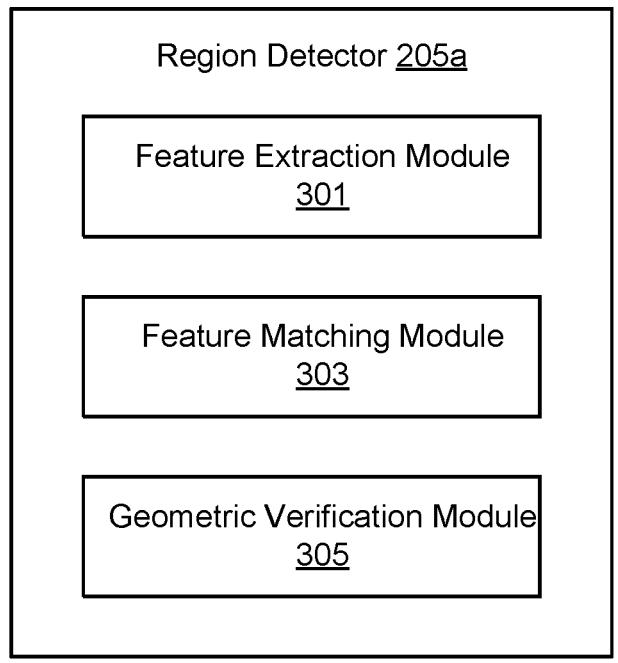
FIG. 3A is a block diagram of a first embodiment of a region detector for extracting regions of interest from an image.

FIG. 3A is a block diagram of a first embodiment of a region detector 205 for detecting one or more ROIs in a query image using model-based features extraction. As illustrated, the region detector 205a may include a feature extraction module 301, a feature matching module 303, and a geometric verification module 305.

The feature extraction module 301 may include software and/or logic to provide the functionality for determining a set of image features in the query image. The determined image features may be partially or fully invariant to scale, rotation, ambient lighting, image acquisition parameters, etc. In some embodiments, the feature extraction module 301 may locate a set of features in the query image and determine a location (e.g., x-y coordinates or a relative location), an orientation, an image descriptor, etc. for each feature. For example, the feature extraction module 301 may use corner detection algorithms (e.g., Tomasi corner detection algorithm, Harris and Stephens corner detection algorithm, etc.) to determine feature location. In other examples, the feature extraction module 301 may use feature description algorithms (Binary Robust Independent Elementary Features (BRIEF), ORB (Oriented FAST and Rotated BRIEF), Scale-Invariant Feature Transform (SIFT), Speeded Up Robust Features (SURF), HOG (Histogram of Oriented Gradients), etc.) to determine the image feature descriptors. In some embodiments, an image feature descriptor is a 32-dimensional number describing the image sub-region covered by the feature.

In some embodiments, the feature extraction module 301 may send data describing the set of image features extracted from the query image to the feature matching module 303.

In some embodiments, the feature extraction module 301 may store data describing the set of extracted features in the data storage 243.

The feature matching module 303 may include software and/or logic to provide the functionality for matching determined features of the query image against features of the indexed images in an electronic database. In some embodiments, the feature matching module 303 may receive a set of extracted features of the query image from the feature extraction module 301, and retrieve a set of stored features of the indexed images from the data storage 243. In some embodiments, a set of features may include one image feature or a plurality of image features. The feature matching module 303 may compare the extracted features of the query image with the stored features associated with the indexed images to identify one or more candidate indexed images that contain matching features. In some embodiments, the feature matching module 303 may determine whether a closest match to each feature of the query image exists among the features previously indexed. For example, the feature matching module 303 may access the k-dimensional tree storing indexed image features in the data storage 243, and use a library (e.g., FLANN) to perform approximate nearest neighbor searches on the k-dimensional tree for one or more feature matches.

In some embodiments, the feature matching module 303 may send matching features in the query image and matching features in the one or more indexed images to the geometric verification module 305. In some embodiments, the feature matching module 303 may store the matching features in the data storage 243.

The geometric verification module 305 may include software and/or logic to provide the functionality for determining a geometric consistency between the matching features in the query image and the matching features in the candidate indexed images identified by the feature matching module 303. In some embodiments, the geometric verification module 305 may receive two sets of matching features (in the query image and in a candidate indexed image) from the feature matching module 303. The geometric verification module 305 may determine whether the matching features in the query image form a shape that is geometrically consistent with the shape formed by the matching features in the candidate indexed image, e.g., using RANdom Sample Consensus (RANSAC) algorithm. The two sets of features in the query image and in the candidate index image are geometrically consistent if they have the same shape, e.g., one set of features can be transformed to the other set by one or more operations including translation, rotation, scaling, etc. In some embodiments, if the shape formed by the matching features in the query image is geometrically consistent with the shape formed by the matching features in the candidate indexed image, the region detector 205 identifies the shape formed by the matching features in the query image as a ROI. The ROI may be represented by a bounding box enclosing the matching features and may be identified by a location (absolute location, e.g., x-y coordinates, or relative location) of the bounding box in the query image. In one embodiment, the region detector 205 may use other methods for performing image search and image matching such as those described in U.S. Pat. No. 8,144,921.

Figure 3B:
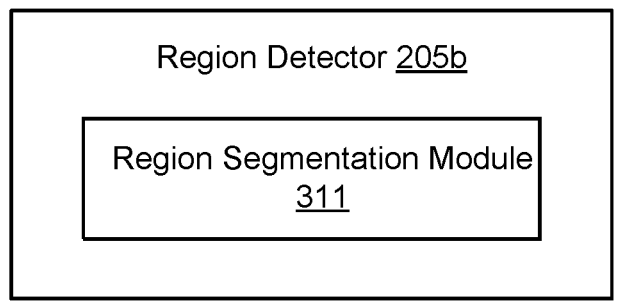
FIG. 3B is a block diagram of a second embodiment of a region detector for extracting regions of interest from an image.

FIG. 3B is a block diagram of a second embodiment of a region detector 205 for detecting one or more ROIs in a query image using a region-based segmentation method. As illustrated, the region detector 205b may include a region segmentation module 311 for localizing and partitioning the query image into one or more ROIs. For example, the region segmentation module 311 may align the query image with a corresponding planogram to locate multiple packaged products, price labels, and other objects of interest. In some embodiments, the determined location may be an absolute position of the object with its x-y coordinates in the query image. In some embodiments, the determined location may be a relative location of the object, for example, a relative distance(s) from the object to one or more points of reference (e.g., a light source, a sign, a bottom shelf of the shelving unit, other packaged products appear in the scene, etc.). In some embodiments, the region segmentation module 311 may determine the image area covered by the located object in the query image as a detected ROI. The detected ROI may be represented by a bounding box surrounding the located object and may be identified by a location (absolute location, e.g., x-y coordinates, or relative location) of the bounding box in the query image.

In some embodiments, the region detector 205 may detect a plurality of ROIs in a given query image and may generate ranking scores for the detected ROIs based on one or more criteria. For example, the region detector 205 may rank the detected ROIs based on a degree of match between the matching features included in the ROI of the query image and the matching features in the index image, and/or the level of geometric consistency between the shapes formed by these two sets of matching features. In other embodiments, the region detector 205 may rank the detected ROIs based on a size of the ROI (e.g., big or small), a location of the ROI (e.g., close to center or edge of the query image), etc. Other examples of ranking criteria are possible and contemplated. In some embodiments, the region detector 205 may return only the ROIs that satisfy a predetermined threshold value. In other embodiments, the region detector 205 may return top-k in the ranked list of ROIs.

In some embodiments, the region detector 205 may group the detected ROIs based on spatial locations and identify top-k ROIs to return for each spatial location in the query image. In particular, the region detector 205 may aggregate two or more ROIs that share a similar spatial location in the query image into a group of ROIs, rank the group of ROIs, and return top-k ROIs in the group for that particular spatial location. In some embodiments, two or more ROIs are considered sharing a similar spatial location if their positions in the query image are associated with the same item (e.g., the same points of reference or the same detected object such as a packaged product). The spatial location of the ROI may be determined based on a comparison of the query image with the planogram associated with the scene.

In some embodiments, the region detector 205 may send one or more ROIs detected in the query image to the classification module 207 for classification using convolutional neural network and/or to the image matching module 209 for performing modeled-feature-based matching. In some embodiments, the region detector 205 may store the detected ROIs in the data storage 243.

The classification module 207 may include software and/or logic to classify a region of an image, e.g., a ROI of the query image. For example, when a ROI containing a potential object in a query image has been localized by the region detector 205, the ROI (e.g., the image content surrounded by its bounding box) may be fed into the classification module 207 to be assigned to one or more classes. In some embodiments, the classification module 207 may include one or more convolutional neural networks (CNN) and/or any kind of machine learning classifiers that use learned features, representation learning, deep learning, or any combination thereof to classify the ROI. The classification module 207 may be referred to herein as the CNN classification module 207.

In some embodiments, the CNN classification module 207 may be provided with a large corpus of training data. In some embodiments, the training data may be generated from results of product recognition using model-based features or other product recognition techniques. In some embodiments, these product recognition results may be subjected to manual evaluation before being provided to the CNN classification module 207 as verified training data. The training data for product recognition using convolutional neural networks may include a training dataset, a validation dataset, and a testing dataset. The training dataset may include positive examples and negative examples. In some embodiments, positive examples may be training samples that include highly visible product images (e.g., more than 90% of the product, or a stack of products, is visible in the image). Negative examples may be training samples that include no product images or include insufficiently visible product images (e.g., less than 40% of the product, or a stack of products, is visible in the image). In some embodiments, the training dataset is used to train the convolutional neural networks. The validation dataset is used to validate the training, for example, determining the optimal number of hidden units, determining stopping point for backpropagation to prevent overfeeding, etc. The test dataset is used to evaluate the performance of the convolutional neural networks that have been trained, for example, measuring the error rates, etc. The CNN classification module 207 may infer from the training data one or more rules for extracting image features and for using those image features in class assignment of an object under test (e.g., a ROI). Under this approach, the CNN classification module 207 can be trained to extract features and recognize products at coarse-grained level (e.g., raw categorization of products) and fine-grained level (e.g., refined categorization of products, discrimination of similar products from the same brand or category).

In some embodiments, the CNN classification module 207 may be trained to create multiple classes. The generated classes may include a plurality of product classes, each product class is associated with a product having a unique product identifier (e.g., a UPC code or other symbolic product ID). In some embodiments, the product class may also be associated with a representative image which depicts its product's packaging. In the case where two packaged products have the same UPC code, but have different packages (e.g., due to seasonal promotion) the CNN classification module 207 may be trained with one class for each package. In some embodiments, a product class may have multiple representative images describing a package of the associated product on different sides or from different angles.

In some embodiments, the classes generated by the CNN classification module 207 may include a plurality of category classes. A category class may be associated with multiple product identifiers (e.g., UPC codes) of multiple products that belong to the same category. For example, the CNN classification module may generate a category class for toothpaste and another category class for deodorant. In this example, the CNN classification module 207 may classify ROIs in the query image into category classes when coarse product categorization of the query image is required. In addition to type of the product, other criteria to define a category are also possible and contemplated.

In some embodiments, the classes generated by the CNN classification module 207 may include a non-product class.

The non-product class is not associated with any product. In some embodiments, the CNN classification module 207 may be trained to classify a ROI into the non-product class when the ROI is incorrectly detected by the region detector 205, and thus no product or only insufficient visible portion of the product (or a stack of products) is included in the ROI. During the training process, the non-product class is considered a desired outcome class when the convolutional neural network is provided with negative examples.

In some embodiments, the CNN classification module 207 may receive one or more ROIs in the query image from the region detector 205. When multiple instances of object are present in the scene, feeding the ROIs in the query image to the CNN classification module 207 is particularly advantageous because it allows the CNN classification module 207 to focus on areas of the query image that potentially contain objects of interest (e.g., a packaged product), and thereby improving recognition performances. In some embodiments, the CNN classification module 207 may assign a ROI one or more classification scores corresponding to one or more product classes (and/or category classes) and the non-product class using the rules it inferred from the training data. In some embodiments, a classification score of a ROI corresponding to a product class indicates a likelihood that the product depicted in that ROI is the product associated with the product class. A classification score of a ROI corresponding to a category class indicates a likelihood that the product depicted in that ROI belongs to the category associated with the category class. A classification score of a ROI corresponding to the non-product class indicates a likelihood that the ROI is an incorrect ROI in which no product or only an insufficiently visible portion of product(s) is included. In some embodiments, the classification score may be generated in the form of probabilities.

As described above, the CNN classification module 207 may generate classification scores for each ROI of the query image. Classification scores for each ROI may be provided for each available product class (and/or category class) and the non-product class. In some embodiments, the CNN classification module 207 may classify the ROI into a product class (and/or category class) or the non-product class based on the classification scores. For example, the ROI may be classified into the class for which the ROI is assigned the highest classification score. In these embodiments, if the class for which the ROI is assigned the highest classification score is a product class, the CNN classification module 207 may return the class identifier (e.g., class label), the product identifier (e.g., the UPC code) and the representative image of the product class assigned to the ROI, and the classification score of the ROI corresponding to that assigned product class. If the class for which the ROI is assigned the highest classification score is the non-product class, the CNN classification module 207 may return the class identifier of the non-product class and the classification score of the ROI corresponding to the non-product class. In this situation, the ROI may be provided to the image matching module 209 to be interpreted using modeled-feature-based matching.

In some embodiments, the CNN classification module 207 may classify the ROI into multiple classes, for example, if the classification scores of the ROI corresponding to those classes satisfy a predetermined classification threshold value. In some cases, even the highest classification score assigned to the ROI may not satisfy the predetermined classification threshold value. In this situation, because the ROI is assigned low classification scores (which may indicate that the CNN classification module 207 classifies the ROI with low confidence), the ROI may also be provided to the image matching module 209 to be interpreted using modeled-feature-based matching. The classification scores of one or more ROIs may be used separately, or in combination (e.g., when two or more ROIs locate in a similar spatial location of the query image) to determine result product classes for one or more products presented in the query image.

In some embodiments, the CNN classification module 207 may send the results of classification of one or more ROIs to the ranking module 211 to identify the depicted products. As described above, the result of classification of a ROI may include class information (e.g., the class identifier such as a class label, the product identifier such as the UPC code, the representative image, etc.) of the product class assigned to the ROI, and the classification score of the ROI corresponding to the assigned product class. If a ROI is assigned to the non-product class, the result of classification of the ROI may include class information (e.g., class identifier) of the non-product class and the classification score of the ROI corresponding to the non-product class. In other embodiments, the result of classification of a ROI may include the classification scores of that ROI corresponding to all available classes (product classes and the non-product class). In some embodiments, the CNN classification module 207 may store the results of classification in the data storage 243.

The image matching module 209 may include software and/or logic to provide the functionality for matching a ROI in the query image to stored images using model-based features. In particular, the image matching module 209 may match the ROIs in the query image to product images in an index to generate a list of matching index images and their corresponding matching scores. In some embodiments, the results of the modeled-feature-based matching generated by the image matching module 209 may be combined with the results of classification generated by the classification module 207 to produce adjusted classification scores for the ROIs. It should be understood that the modeled-feature-based matching of regions of interest is optional in some embodiments, therefore the image matching module 209 is shown with dashed lines in FIG. 2.

In some embodiments, the image matching module 209 may receive one or more ROIs of the query image from the region detector 205 and receive one or more indexed images from the data storage 243. In some embodiments, the image matching module 209 may receive only the indexed images corresponding to packaged products that are presented in the planogram associated with the scene. This is particularly advantageous because it limits the number of indexed images to be matched by the image matching module 209. The image matching module 209 may match the ROIs in the query image to indexed images using model-based features. In particular, the image matching module 209 may determine a set of image features in the ROI. The image matching module 209 may match the set of determined features of the ROI to a set of stored features associated with indexed images in the data storage 243 to identify one or more candidate index images. A set of features may include one image feature or a plurality of image features. The image matching module 209 may then determine whether the matching features of the ROI in the query image form a shape that is geometrically consistent with the shape formed by the matching features in the candidate index images. If the geometric consistency is determined, the image matching module 209 may identify the candidate index image as a matching index image of the ROI in the query image. In some embodiments, the steps for matching the ROIs to indexed images using model-based features by the image matching module 209 may be similar to the steps for detecting the ROIs using model-based features by the region detector 205a, but performed at a finer grained level of details to allow matching of images. In other embodiments, the image matching module 209 may identify the matching index images using the result of modeled-feature-based computations performed by the region detector 205a.

In some embodiments, the image matching module 209 may assign a matching score to an indexed image based on the two determined matches. In particular, the matching score may be generated based on a degree of match between matching features of the ROI and matching features of the indexed image, and/or the level of geometric consistency between the shapes formed by these two sets of matching features. In some embodiments, an indexed image may be assigned a variety of matching scores, e.g., an area matching score, a color matching score, a number of inliers, etc. In these embodiments, the number of inliers is a number of geometrically consistent matching sets of features identified by the image matching module 209. The color matching score may describe the similarity of color between the matching features in the index image and in the ROI. The area matching score may indicate a ratio between a convex hull of the matching feature points in the index image and the bounding box of the ROI.

The matching score provides an indicator as to how well an index image matches the ROI. In some embodiments, the image matching module 209 may identify an indexed image as a matching index image of the ROI if the matching score computed for that indexed image satisfies a threshold value. In some embodiments, the image matching module 209 may return image identifier and matching score of the matching index image as results of matching. In some embodiments, the image matching module 209 may retrieve product metadata being stored in association with the matching index image. Examples of product metadata include packaging dimension, packaging identifier, price of the product as sold in the retailer store, the number of product facing (e.g., one facing for one box of a brand or one stack of more than one identical products, two facings for two boxes of the same brand sitting side by side or two stacks of more than one identical products sitting side by side), shelf identifier, width, height, depth, area, diagonal length, color, product attributes such as product name, product identifier, product weight, product volume, product description, product size, ingredients, nutritional information, manufacturer brand, model number, and material, among other things. In some embodiments, the results of matching may also include the product identifier (e.g., the UPC code) of the product associated with the matching index image.

In some embodiments, the image matching module 209 may send the results of matching of one or more ROIs to the ranking module 211 to be used in identifying the depicted products. As described above, the result of matching of a ROI may include the image identifier of the matching index image, the matching score, and product identifier (e.g., the UPC code) of the product associated with the matching index image. In some embodiments, the image matching module 209 may store the results of matching in the data storage 243.

The ranking module 211 may include software and/or logic to provide the functionality for processing the results of the classification and/or the results of matching to identify products depicted in the query image.

In some embodiments, the ranking module 211 may identify the products depicted in the query image using only the results of classification of one or more ROIs received from the classification module 207. As described above, the results of classification of a ROI may include class information associated with one or more assigned product classes (e.g., the class label, the product identifier, the representative image) and the classification scores of the ROI corresponding to those assigned product classes. In some embodiments, the ranking module 211 may rank the product classes assigned to the ROI based on the classification scores. In some embodiments, the ranking module 211 may adjust the rankings of the product classes based on the relative location of the ROI in the planogram associated with the scene. For example, the ranking module 211 may give a higher rank to product class A if the planogram indicates that the location depicted in the ROI corresponds to packaged products of the product class A. The ranking module 211 may identify the product class having the highest ranking as the result class. The ranking module 211 may then return the product associated with the result class as recognized product for the ROI in the query image and the classification score corresponding to that result class as confidence score of the product recognition.

In some embodiments, the ranking module 211 may combine the results of classification of the ROIs sharing a similar spatial location in the query image to determine a result class for the spatial location. As an example, the ranking module 211 may receive a first classification result of a first ROI in the query image as (class A: 85%, class B: 72%, class C: 55%). The ranking module 211 may receive a second classification result of a second ROI adjacent to the first ROI as (class A: 60%, class B: 65%, class D: 59%). The ranking module 211 may determine that the first ROI corresponds to a portion of a toothpaste box, the second ROI corresponds to another portion of the toothpaste box, and thus determine that the first ROI and the second ROI share a similar spatial location. The ranking module 211 may then determine the result class for the similar spatial location by combining the first classification result and the second classification result. For example, the ranking module 211 may determine that the first ROI has the size of bounding box greater than the second ROI, and that the first ROI has a higher range of classification scores (which may indicate that the CNN classification module 207 classifies the first ROI with more confidence). As a result, the ranking module 211 may give more weight to the first classification result and determine class A as the result class for the spatial location associated with the toothpaste box. The ranking module 211 may return the packaged product associated with class A as recognized product with a confidence score within the range of [60%, 85%]. In some embodiments, the ranking module 211 may also return representative image of class A, which depicts packaging of the recognized product.

In some embodiments, the ranking module 211 may merge the classification results of one or more ROIs determined by the convolutional neural network with the matching results of the one or more ROIs determined using model based features to identify the product depicted in the query image. In particular, the ranking module 211 may receive classification results of the ROIs from the classification module 207 and receive the matching results of the ROIs from the image matching module 209. As described above, in some embodiments, the matching result of each ROI may include a UPC code of the product associated with a matching index image and matching scores assigned to that matching index image. The classification results of each ROI may include classification scores of the ROI corresponding to all available classes. In these embodiments, the ranking module 211 may adjust the classification scores of each ROI using the results of matching. For example, the ranking module 211 may give a higher weight to the classification score of the product class having the same UPC code as the matching index image. In other embodiments, the ranking module 211 may determine whether the matching score of the matching index image satisfies a threshold value, and if so, give a higher weight to the classification score of the product class having the same UPC code. In some embodiments, the ranking module 211 may compute the amount of weight for adjustment based on the matching score. The ranking module 211 may then use the adjusted classification scores of the one or more ROIs to determine the result classes for the ROIs (or for the spatial locations) in the query image as described above. In these embodiments, products associated with the results classes may be returned as recognized products for the ROIs of the query image, and the corresponding adjusted classification scores may be used to calculate confidence scores of the product recognition. In some embodiments, the adjusted classification scores may be returned as confidence scores.

In some cases, the query image provided as input to the hybrid detection recognition application 103 may be an image of a single packaged product. In these situations, the entire query image may contain potential objects for recognition purpose and therefore may be considered a single ROI. As a result, product recognition using classification by the convolutional neural network and product recognition using model-based features may be performed on the entire query image without detection of ROIs by the region detector 205. As described above, the hybrid detection recognition application 103 may determine one or more result classes and return the corresponding products as recognized products for the query image of the single product. These embodiments may be useful in a market research application or a retail application that assigns product identifier (e.g., UPC code) to product images. In other embodiments, the region detector 205 may still detect the ROIs in the query image of a single product and product recognition is performed on the detected ROIs.

In some examples, the result class identified by the CNN classification module 207 for the query image (or one or more ROIs of the query image) may be the non-product class associated with no product. This may happen when the ROI(s) are erroneously detected by the region detector 205. In other examples, the CNN classification module 207 may assign the query image (or one or more ROIs of the query image) low classification scores, which may not satisfy a predetermined classification threshold value. In these two situations, the query image (or the one or more ROIs) may be provided to the image matching module 209 for matching against indexed images using model-based features. The ranking module 211 may receive the results of matching (e.g., image ID of the matching index images and matching scores) from the image matching module 209, and rank these matching results based on the matching scores. In some embodiments, the ranking module 211 may identify the index image having the highest matching score and return the product metadata (e.g., the UPC code) associated with that index image as recognized product for the query image (or the one or more ROIs). The matching score of that matching index image may also be returned as confidence score for product recognition. In some embodiments, the matching features and matching results of the query image determined by the image matching module 209 may be verified by a manual evaluation and provided to the convolutional neural network as neural network training data.

In some embodiments, for the purpose of generating training data for the convolutional neural network, the image matching module 209 may match a query image (or one or more ROIs of the query image) used for training against indexed images that are available in the data storage 243. In other embodiments, the image matching module 209 may determine a subset of indexed images that are associated with new products from the available indexed images, and match the query image against the subset of indexed images. In these embodiments, the new products may be packaged products that have not been assigned to a product class by the CNN classification module 207 before, and thus, do not have a corresponding product class. These embodiments are particularly advantageous because they limit the amount of modeled-feature-based matching to be performed by the image matching module 209, and focus on the subset of indexed images that are likely to be matching indexed images of the query image used for training purpose. In some embodiments, a training cycle to retrain the neural network may be scheduled when the data storage 243 is updated with newly indexed product(s).

In some embodiments, the ranking module 211 may return the recognition results (e.g., UPC code and representative image of the assigned product class, confidence score, etc.) in a JavaScript Object Notation (JSON) file format. The ranking module 211 may send the recognition results to the user interface engine 213 for presenting to the user. In some embodiments, the ranking module 211 may store the recognition results in the data storage 243.

The user interface engine 213 may include software and/or logic for providing user interfaces to a user. For example, the user interface engine 213 may receive instructions from the controller 201 to generate a graphical interface that instructs the user to capture an image of a retail shelf with stocking products. As another example, the user interface engine 213 receives instructions from the controller 201 to generate a graphical interface that instructs the user to capture an image of an individual product. In another example, the user interface engine 213 sends the graphical user interface data to an application (e.g., a browser) in the client device 115 via the communication unit 241 causing the application to display the recognition results of the hybrid detection recognition application 103 in a user interface. In some embodiments, the user interface displaying the recognition results may include graphical elements that allow the user to interact with the recognition results, e.g., making a purchase order of the recognized product or finding a nearby retail store where the recognized product is on sale, etc.

Figure 4:
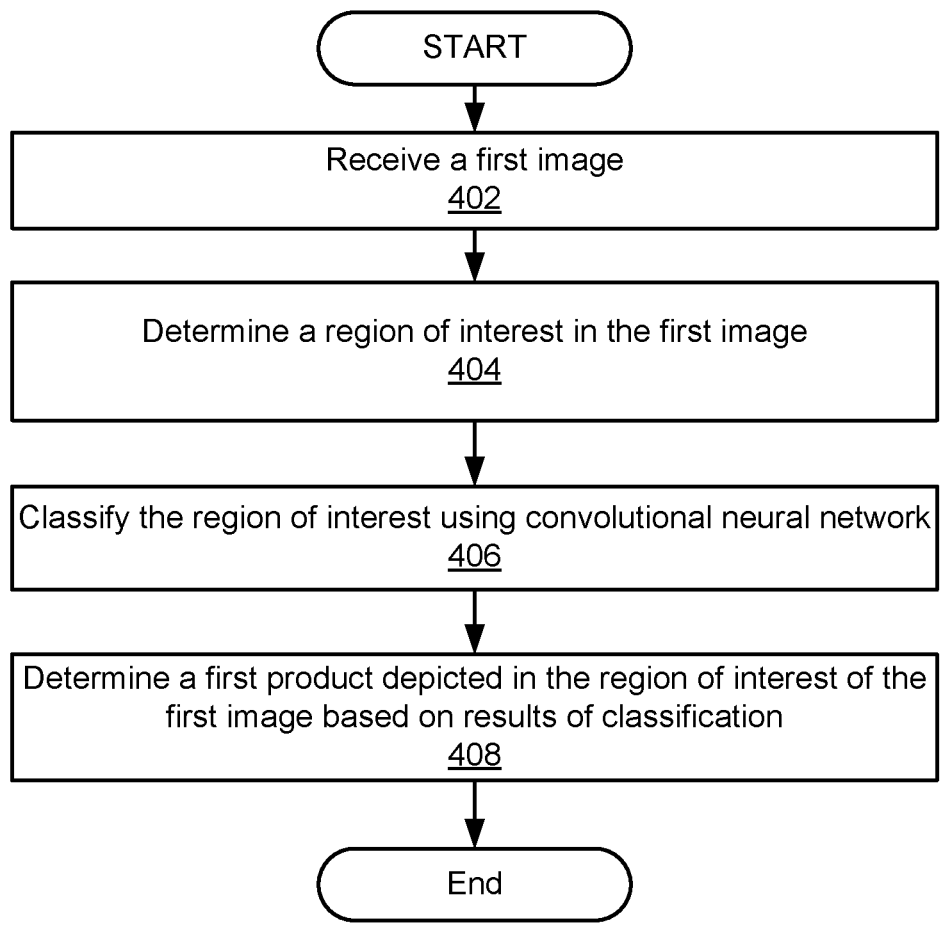
FIG. 4 is a flow diagram illustrating a first embodiment of a method for recognizing an object in an image using hybrid detection recognition.

FIG. 4 is a flow diagram illustrating a first embodiment of a method 400 for recognizing an object in a query image using hybrid detection recognition. As described above, the hybrid detection recognition application 103 may include the controller 201, the image processor 203, the region detector 205, the classification module 207, the image matching module 209, the ranking module 211, and the user interface engine 213. At 402, the controller 201 may receive a first image as a query image, e.g. from the client device 115. At 404, the region detector 205 may determine a region of interest (ROI) of the first image to be processed. For example, the region detector 205 may detect the ROI using model-based features extraction or region segmentation method, as described above. At 406, the classification module 207 may classify the ROI using the convolutional neural network. For example, the classification module 207 may generate for the ROI one or more classification scores corresponding to each available product classes and the non-product class. The classification module 207 may then assign the ROI to one or more classes based on the classification scores. In this embodiment, the classification module 207 performs the entire task of interpreting the image content covered by the detected ROI for product recognition. At 408, the ranking module 211 may determine a first product depicted in the ROI of the first image based on the result of classification. For example, the ranking module 211 may rank the product classes assigned to the ROI based on the classification scores and identify the product class having the highest ranking as the result class. The ranking module 211 may then return the product identifier (e.g., the UPC code) associated with the result class as recognized product for the ROI.

Figure 5:
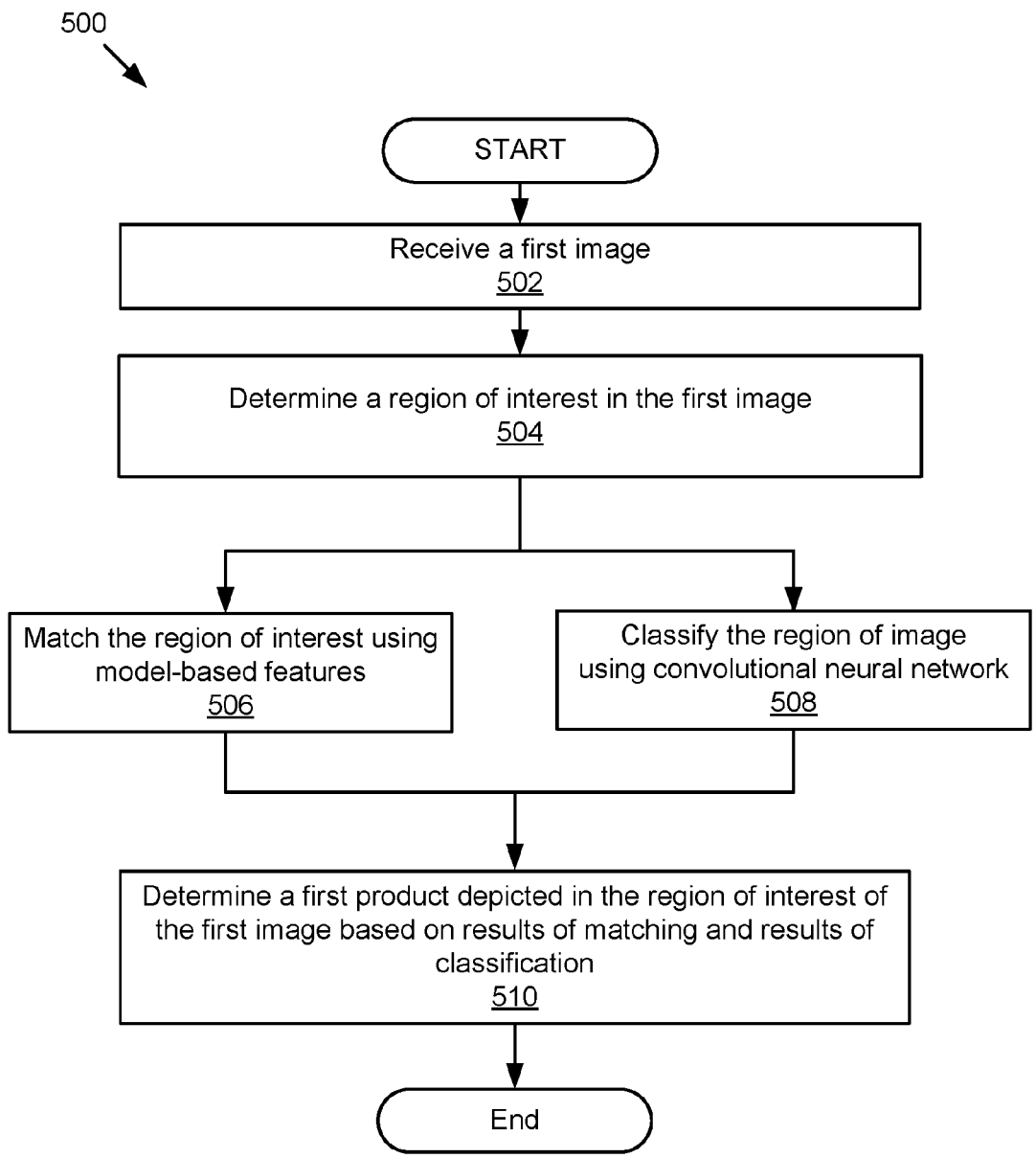
FIG. 5 is a flow diagram illustrating a second embodiment of a method for recognizing an object in an image using hybrid detection recognition.

FIG. 5 is a flow diagram illustrating a second embodiment of a method 500 for recognizing an object in a query image using hybrid detection recognition. At 502, the controller 201 may receive a first image as a query image, e.g., from the client device 115. At 504, the region detector 205 may determine a region of interest (ROI) of the first image. At 506, the image matching module 209 may match the ROI against indexed images using model-based features to determine a matching index image(s) and a matching score(s) corresponding to the matching index image(s). In some embodiments, the matching index image contains geometrically consistent matching sets of features that match extracted features of the ROI. At 508, the classification module 207 may classify the ROI using the convolutional neural network. As described above, the classification module 207 may generate for the ROI one or more classification scores corresponding to each available product classes and the non-product class. The classification module 207 may then assign the ROI to one or more classes based on the classification scores. In this embodiment, the interpretation of the ROI for product recognition is performed by the image matching module 209 (block 506) and by the classification module 207 (block 508). The modeled-feature-based matching in block 506 and the classification using convolutional neural network in block 508 can be performed in parallel, or in serial with either order. At 510, the ranking module may determine a first product depicted in the ROI of the first image based on the results of matching and the results of classification. For example, the ranking module 211 may give a higher weight to a classification score of a product class corresponding to the same UPC code as the matching index image. The ranking module 211 may adjust the classification scores of the ROI using the matching score. The ranking module 211 may then use the adjusted classification scores to determine the recognized product for the ROI of the first image, as described above.

Figure 6:
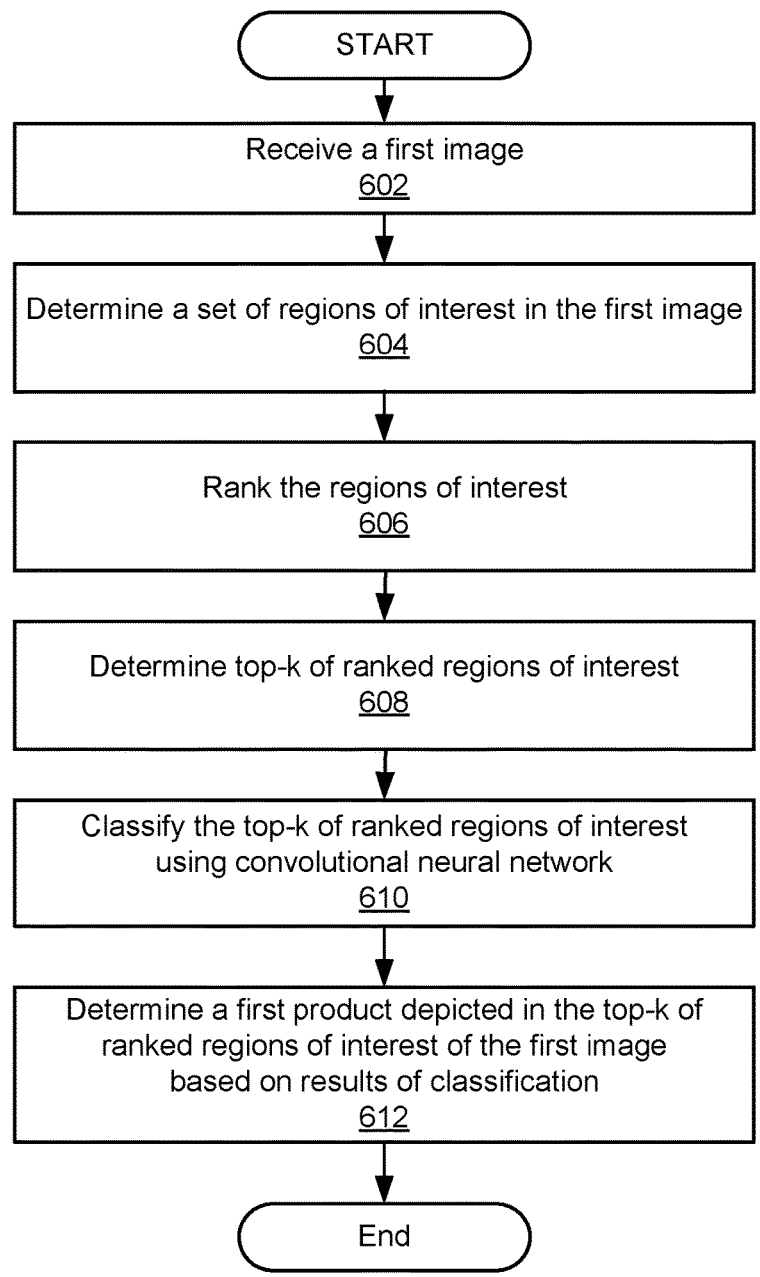
FIG. 6 is a flow diagram illustrating a third embodiment of a method for recognizing an object in an image using hybrid detection recognition.

FIG. 6 is a flow diagram illustrating a third embodiment of a method 600 for recognizing an object in a query image using hybrid detection recognition. At 602, the controller 201 may receive a first image as a query image, e.g., from the client device 115. At 604, the region detector 205 may determine a set of regions of interest (ROIs) of the first image, for example, using model-based features. In some embodiments, the region detector 205 may group the determined ROIs based on spatial locations in the query image. For example, the region detector 205 may aggregate two or more ROIs that share a similar spatial location in the query image into a group of ROIs. At 606, the region detector 205 may rank the ROIs based on one or more ranking criteria. For example, for each group of ROIs corresponding to a spatial location in the query image, the region detector 205 may rank the ROIs in the group based on the size of the ROI, the location of the ROI, a degree of match between the matching features in the ROI and in the indexed image, a level of geometrical consistency between the shapes formed by those two sets of matching features, etc. to generate a ranked list of ROIs. At 608, the region detector 205 may select the top-k in the ranked list of ROIs. For example, the region detector 205 may select four ROIs having the highest ranking scores in the ranked list of ROIs. In some embodiments, k may be a predetermined numeric value. In cases where the number of detected ROIs in the group of ROIs is smaller than k, the region detector 205 may select the entire group of ROIs without ranking the ROIs in block 606. At 610, the classification module 207 may classify the top-k of the ranked list of ROIs using the convolutional neural network. At 612, the ranking module 211 may determine first product(s) depicted in the top-k of the ranked list of ROIs based on the results of classification, as described above.

Figure 8:
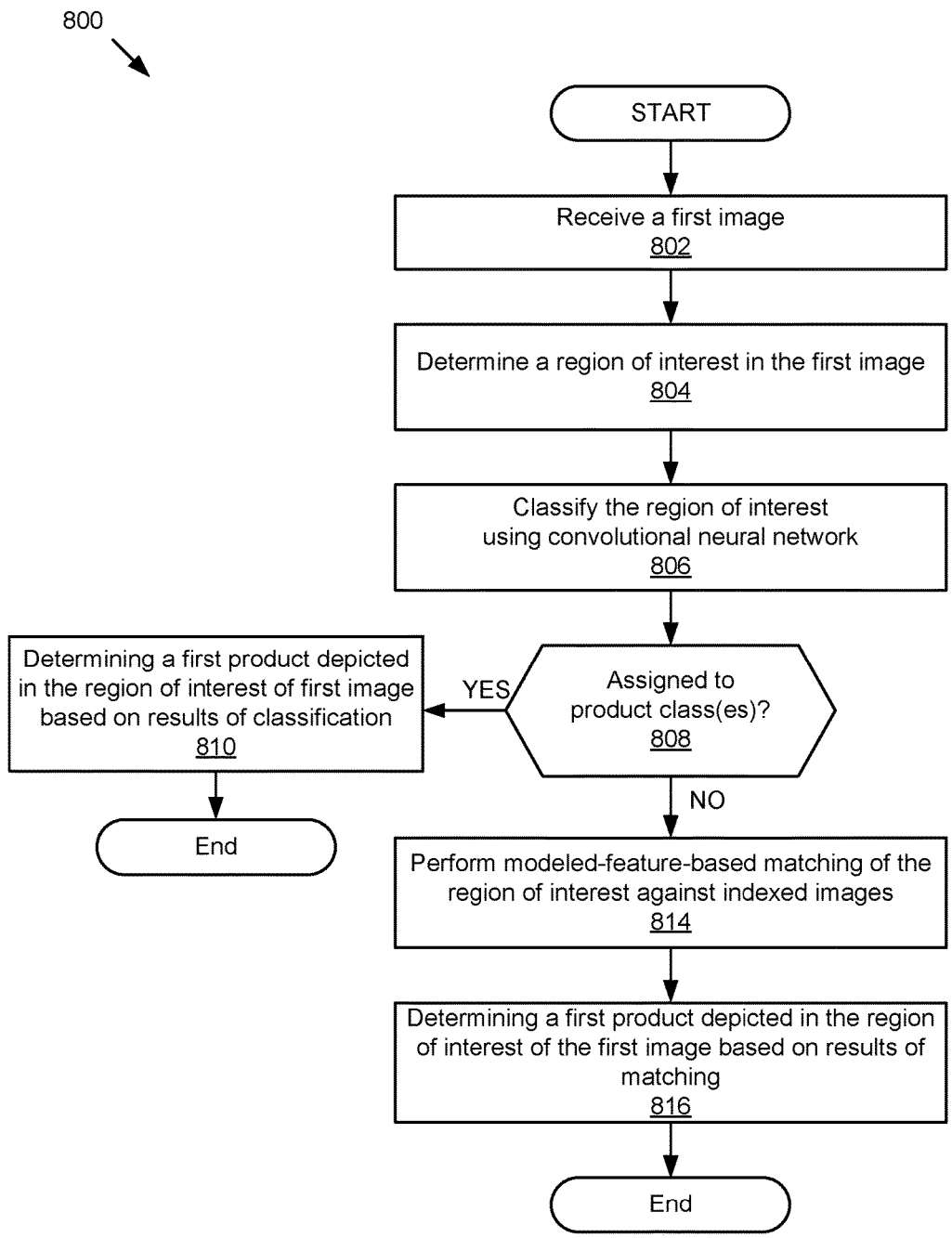
FIG. 8 is a flow diagram illustrating a fourth embodiment of a method for recognizing an object in an image using hybrid detection recognition.

FIG. 8 is a flow diagram illustrating a fourth embodiment of a method 800 for recognizing an object in a query image using hybrid detection recognition. At 802, the controller 201 may receive a first image as a query image, e.g., from the client device 115. At 804, the region detector 205 may determine a region of interest (ROI) of the first image, using model-based features extraction or region segmentation method as described above. At 806, the classification module 207 may classify the ROI using convolutional neural network. For example, the classification module 207 may generate for the ROI one or more classification scores corresponding to each available product classes and the non-product class. The classification module 207 may then assign the ROI to one or more classes based on the classification scores. At 808, the ranking module 211 may determine whether the classification module 207 assigned the ROI to a product class. If the ROI is assigned to one or more product classes, the method 800 proceeds to block 810. At 810, the ranking module 211 may determine a first product depicted in the ROI based on the results of classification, as described above. If the ranking module 211 determines at 808 that the classification module 207 did not assign the ROI to a product class (for example, the classification module 207 classified the ROI into the non-product class; in this situation, the non-product class may be considered the result class indicating the result of classification), the method 800 proceeds to block 814. In some embodiments, if the result of classification generated by the classification module 207 indicates that classification scores of the ROI corresponding to all available product classes do not satisfy a predetermined classification threshold value, the method 800 also proceeds to block 814. At 814, the image matching module 209 may perform model-based feature matching of the ROI in the first image against an index of product images to determine a matching index image(s) and a matching score(s) corresponding to the matching index image(s). At 816, the ranking module 211 may determine a first product depicted in the ROI of the first image based on the results of matching generated by the image matching module 209. For example, the ranking module 211 may rank the matching index images based on the matching scores. The ranking module 211 may then identify the index image having the highest matching score and return the product metadata (e.g., the UPC code) associated with that matching index image as recognized product for the ROI of the first image.

In the example methods 400, 500, 600, and 800 described above, a plurality of ROIs may be detected in the first image by the region detector 205. In some embodiments, the region detector 205 may determine whether the detected ROIs share the same similar spatial location in the first image. For example, the region detector 205 may compare the location of the ROIs adjacent to each other against a planogram associated with the scene to determine whether the adjacent ROIs are associated with the same item, for example, the same points of reference or the same object of interest (e.g., a packaged product). If the region detector 205 determines that two or more ROIs in the first image share a similar spatial location, the ranking module 211 may combine the recognition results (e.g., the result of classifications and/or the results of matching) of the two or more ROIs to determine recognized product for the spatial location. The combination of the recognition results may take into account the UPC codes returned as recognized products for each ROI together with their corresponding confidence score, positions of the ROIs relative to each other, the size of the ROI's bounding box, etc.

Figure 7:
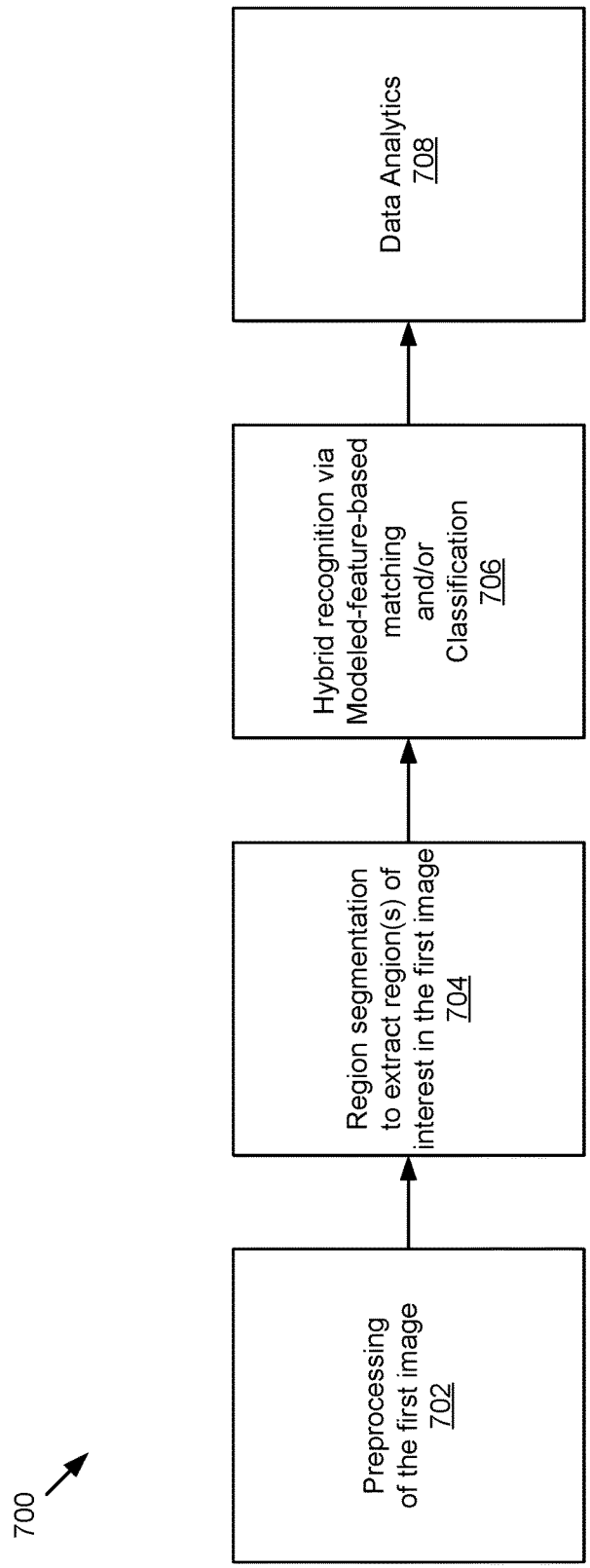
FIG. 7 is a high-level flow diagram illustrating one embodiment of a method for recognizing an object in an image using hybrid detection recognition, including preprocessing of the image and post-processing of the results.

FIG. 7 is a high-level flow diagram illustrating one embodiment of a method 700 for recognizing an object in a first image using hybrid detection recognition. At 702, the image processor 203 may perform preprocessing of the first image, e.g., shelf detection, distortion correction, histogram equalization, etc. At 704, the region detector 205 may extract regions of interest (ROIs) from the first image. As described above, the region detector 205 may detect the ROIs in the first image using model-based features, alignment with planogram to localize products, price labels, etc. At 706, the ROIs may be interpreted by the classification module 207 using convolutional neural network and/or the image-matching module 209 using the modeled-feature-based matching, as described above. In this block, the products and/or price labels represented in the first image may be recognized based on this hybrid detection recognition. At 708, the computing device 200 may perform post-processing of the recognition results, for example, determining pricing information, determining facings, perform corrective actions, etc.

Figure 9:
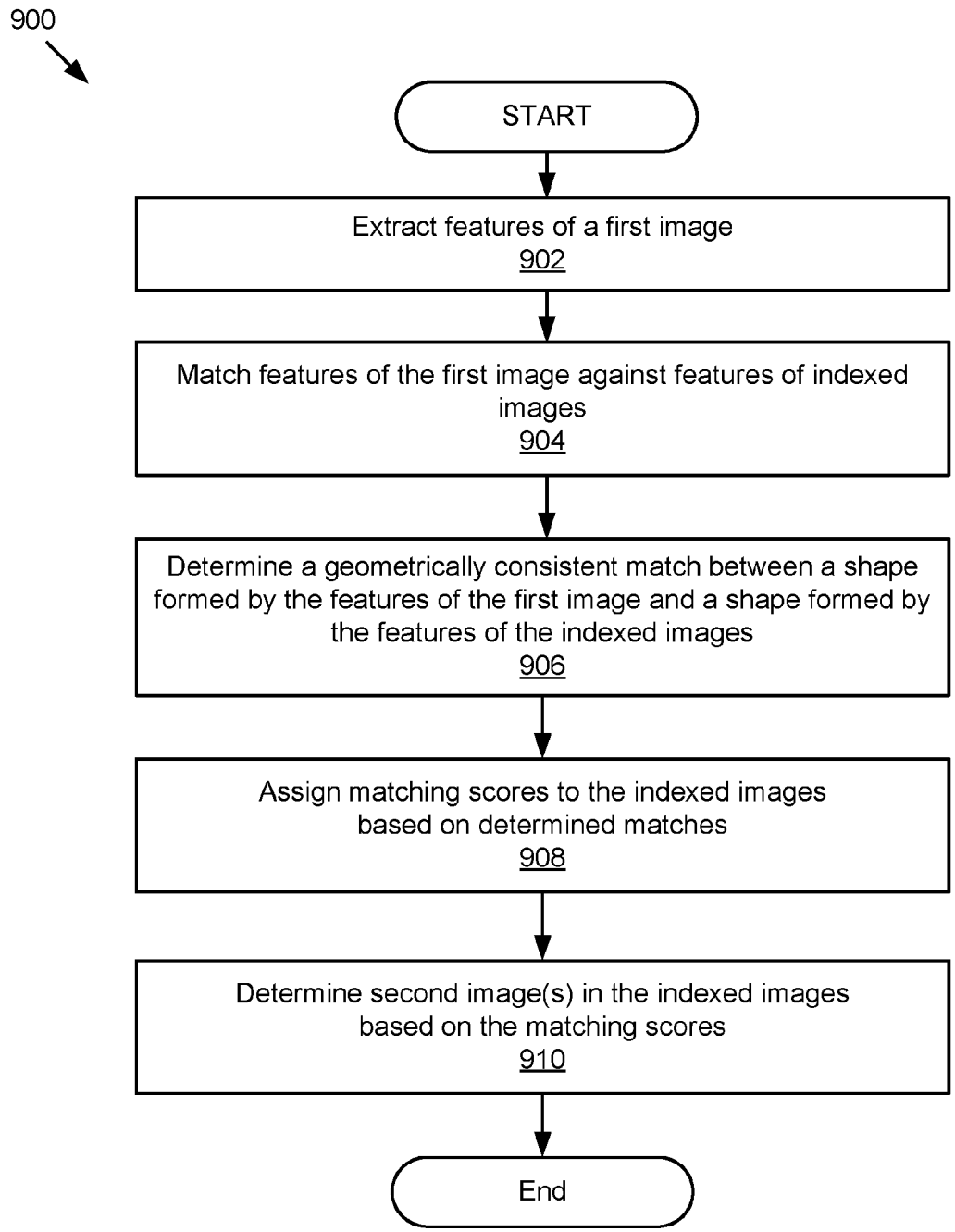
FIG. 9 is a flow diagram illustrating one embodiment of a method for matching an image against previously stored images using model-based features.

FIG. 9 is a flow diagram illustrating one embodiment of a method 900 for matching an image against previously stored images using model-based features. As an example, a first image received from the client device 115 as query image may be matched against indexed images stored in the data storage 243. At 902, the image matching module 209 may extract image features of the first image, for example, using corner detection algorithms, feature description algorithms, etc. Examples of modeled features include ORB features, SIFT features, SURF features, HOG features, features extracted from the first image, etc. At 904, the image matching module 209 may match extracted features of the first image against stored features of indexed images to identify candidate matching index images that contain the matching features. At 906, the image matching module 209 may determine whether there is a geometrically consistent match between a shape formed by the matching features in the first image and a shape formed by the matching features in the candidate matching images. At 908, the image matching module 209 may determine matching scores for the candidate matching images based on the two determined matches. For example, the image matching module 209 may generate a matching score for a candidate matching image based on how well the extracted features in the first image match the stored features of the candidate matching image and based on the level of geometric consistency between the shapes formed by those two sets of matching features. At 910, the image matching module 209 may determine a second image(s) in the indexed images based on the matching scores. For example, the image matching module 209 may identify the candidate matching images that have the matching score satisfies a threshold value as matching index images of the first image. The matching index images and product metadata associated with them (e.g., the UPC codes) may be return as results of matching and can be used in determining recognized product depicted in the first image as described elsewhere herein.

The technology presented in this disclosure is particularly advantageous in a number of respects. In particular, the technology described significantly improves precision and accuracy of recognition performance. Also, the present technology can detect multiple instances of objects captured in a scene and effectively recognize the objects captured under varying illumination and camera pose conditions. The technology disclosed herein is advantageously useful in applications that require detection and recognition of items presented in images, e.g., retail applications that provide a user with product information, inform the user at which location a product is misplaced, which product should be placed at that location, to which location the misplaced product should be moved, etc.

A hybrid detection-recognition system and method for determining an object or product represented in an image has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "generating", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a non-transitory computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving, by one or more processors, a first image;
determining, by the one or more processors, a plurality of regions of interest that share a similar spatial location in the first image;
ranking, by the one or more processors, the plurality of regions of interest;
selecting, from the plurality of regions of interest, a predetermined number of regions of interest for the similar spatial location based on the ranking;
determining, by the one or more processors, classification scores for the predetermined number of regions of interest using a convolutional neural network, the convolutional neural network assigning the predetermined number of regions of interest the classification scores corresponding to a product class;
matching, by the one or more processors, the predetermined number of regions of interest in the first image to indexed images using model-based features to determine a second image and a matching score associated with the second image;
adjusting, by the one or more processors, the classification scores based on the matching score; and
identifying, by the one or more processors, a first product in the first image based on the adjusted classification scores.

2. The method of claim 1, wherein the product class is associated with a second product, and wherein the classification scores corresponding to the product class indicate a likelihood that the first product in the first image is the second product associated with the product class.

3. The method of claim 1, further comprising:
  determining a first classification score for a first region of interest in the first image;
  determining a second classification score for a second region of interest in the first image;
  determining whether the first region of interest and the second region of interest share the similar spatial location; and
  responsive to the first region of interest and the second region of interest sharing the similar spatial location, combining the first classification score and the second classification score to determine a result class for the similar spatial location.

4. The method of claim 1, wherein matching the predetermined number of regions of interest in the first image to the indexed images using the model-based features comprises:
  extracting a first feature of the first image;
  determining whether the first feature of the first image matches a second feature of the second image;
  determining whether a shape formed by the first feature of the first image is geometrically consistent with a shape formed by the second feature of the second image; and
  responsive to determining that the shape formed by the first feature of the first image is geometrically consistent with the shape formed by the second feature of the second image, identifying the shape formed by the first feature of the first image as one of the predetermined number of regions of interest.

5. A system comprising:
  one or more processors; and
  a memory, the memory storing instructions, which when executed cause the one or more processors to:
    receive a first image;
    determine a plurality of regions of interest that share a similar spatial location in the first image;
    rank the plurality of regions of interest;
    select, from the plurality of regions of interest, a predetermined number of regions of interest for the similar spatial location based on the ranking;
    determine classification scores for the predetermined number of regions of interest using a convolutional neural network, the convolutional neural network assigning the predetermined number of regions of interest the classification scores corresponding to a product class;
    match the predetermined number of regions of interest in the first image to indexed images using model-based features to determine a second image and a matching score associated with the second image;
    adjust the classification scores based on the matching score; and
    identify a first product in the first image based on the adjusted classification scores.

6. The system of claim 5, wherein the product class is associated with a second product, and wherein the classification scores corresponding to the product class indicate a likelihood that the first product in the first image is the second product associated with the product class.

7. The system of claim 5, wherein the instructions further cause the one or more processors to:
  determine a first classification score for a first region of interest in the first image;
  determine a second classification score for a second region of interest in the first image;
  determine whether the first region of interest and the second region of interest share the similar spatial location; and
  responsive to the first region of interest and the second region of interest sharing the similar spatial location, combine the first classification score and the second classification score to determine a result class for the similar spatial location.

8. The system of claim 5, wherein to match the predetermined number of regions of interest in the first image to the indexed images using the model-based features, the instructions further cause the one or more processors to:
  extract a first feature of the first image;
  determine whether the first feature of the first image matches a second feature of the second image;
  determine whether a shape formed by the first feature of the first image is geometrically consistent with a shape formed by the second feature of the second image; and
  responsive to determining that the shape formed by the first feature of the first image is geometrically consistent with the shape formed by the second feature of the second image, identify the shape formed by the first feature of the first image as one of the predetermined number of regions of interest.

9. A computer program product comprising a non-transitory computer readable medium storing a computer readable program, wherein the computer readable program when executed on a computer causes the computer to:
  receive a first image;
  determine a plurality of regions of interest that share a similar spatial location in the first image;
  rank the plurality of regions of interest;
  select, from the plurality of regions of interest, a predetermined number of regions of interest for the similar spatial location based on the ranking;
  determine classification scores for the predetermined number of regions of interest using a convolutional neural network, the convolutional neural network assigning the predetermined number of regions of interest the classification scores corresponding to a product class;
  match the predetermined number of regions of interest in the first image to indexed images using model-based features to determine a second image and a matching score associated with the second image;
  adjust the classification scores based on the matching score; and
  identify a first product in the first image based on the adjusted classification scores.

10. The computer program product of claim 9, wherein the product class is associated with a second product, and wherein the classification scores corresponding to the product class indicate a likelihood that the first product in the first image is the second product associated with the product class.

11. The computer program product of claim 9, wherein the computer readable program when executed on the computer further causes the computer to:
  determine a first classification score for a first region of interest in the first image;
  determine a second classification score for a second region of interest in the first image;
  determine whether the first region of interest and the second region of interest share the similar spatial location; and
  responsive to the first region of interest and the second region of interest sharing the similar spatial location, combine the first classification score and the second classification score to determine a result class for the similar spatial location.

12. The computer program product of claim 9, wherein to match the predetermined number of regions of interest in the first image to the indexed images using the model-based features, the computer readable program when executed on the computer further causes the computer to:
extract a first feature of the first image;
determine whether the first feature of the first image matches a second feature of the second image;
determine whether a shape formed by the first feature of the first image is geometrically consistent with a shape formed by the second feature of the second image; and
responsive to determining that the shape formed by the first feature of the first image is geometrically consistent with the shape formed by the second feature of the second image, identify the shape formed by the first feature of the first image as one of the predetermined number of regions of interest.

\* \* \* \* \*